United States Patent [19]
Burke

[11] 3,767,429
[45] Oct. 23, 1973

[54] LARD FLAVOR CONCENTRATE

[75] Inventor: Claude E. Burke, Cincinnati, Ohio

[73] Assignee: The Procter & Gamble Company, Cincinnati, Ohio

[22] Filed: Dec. 6, 1971

[21] Appl. No.: 208,031

Related U.S. Application Data

[63] Continuation-in-part of Ser. No. 99,674, Dec. 18, 1970, abandoned.

[52] U.S. Cl. ................................. 426/65, 426/200
[51] Int. Cl. .......................... A23d 3/00, A23l 1/26
[58] Field of Search .................. 99/140 R, 122, 123

[56] References Cited
UNITED STATES PATENTS

| 929,925 | 8/1909 | Filbert | 99/122 |
|---|---|---|---|
| 1,047,013 | 12/1912 | Ellis | 99/122 |
| 3,459,556 | 8/1969 | Moroe et al. | 99/23 |

FOREIGN PATENTS OR APPLICATIONS

1,156,472   6/1969   Great Britain

OTHER PUBLICATIONS

Hornstein et al. "Flavor Studies on Beef & Pork," J. Agr. and Food Chem., Vol. 8 No. 6, Nov.-Dec. (1960) pp. 494-498.

"Chemicals Used In Food Processing," Nat'l. Academy of Sciences-Nat'l. Res. Council, Publication 1274, Wash. D.C. (1965) pages 248, 183, 166 and 107.

*Primary Examiner*—Morris O. Wolk
*Assistant Examiner*—Sidney Marantz
*Attorney*—Richard C. Witte et al.

[57] ABSTRACT

A lard flavor concentrate comprising from 1.4 percent to 4 percent by weight of the 2,4-nonadienal, from 3.5 percent to 8 percent by weight of 2,4-decadienal, from 3 percent to 5 percent by weight of 2,5-dimethyl-3-ethyl pyrazine, from 0.1 percent to 0.5 percent by weight of tetramethylpyrazine, and from 6 percent to 30 percent by weight of pyroligneous acid, and the balance comprising an edible dispersant such as glyceride oils, propylene glycol, triacetin, and the like. The combination of the above-mentioned aldehydes, pyrazines and pyroligneous acid each within its carefully prescribed range, provides a lard flavor concentrate which, when added to vegetable oil at a level of from 25 to 250 ppm, give the vegetable oil the flavor and aroma of lard.

10 Claims, No Drawings

LARD FLAVOR CONCENTRATE

CROSS REFERENCE

This application is a continuation-in-part of earlier-filed, [copending], now abandoned application, Ser. No. 99,674, filed Dec. 18, 1970.

BACKGROUND OF THE INVENTION

Lard is defined as fat rendered from fresh, clean, sound fatty tissue from hogs in good health at the time of slaughter. The composition and resulting characteristics of lard are subject to very wide variation, depending upon the particular lard refining process, the feeding habits of the hogs, and the part of the carcass from which the lard is obtained.

Because of the unpredictable composition of any lard sample, products prepared utilizing lard often can vary in texture and eating quality over a wide range. These variations in ultimate product quality are undesirable and represent a negative factor in determining whether or not lard should be employed in baking. Still, many people prefer the aroma and baking characteristics of lard when preparing pastries, pie crusts, cookies, and the like. In other applications, lard is commonly utilized as a spray-on material for saltines and various other types of crackers and snack foods where the aroma and flavor of lard is considered desirable.

In addition to the previously mentioned inconsistency in product performance, lard is also objectionable on a religious basis to some people. Therefore, it would be desirable to develop a lard flavor concentrate which when added to vegetable oils or shortenings would provide in the vegetable oil or shortening the flavor and aroma characteristics typically associated with lard. Such a "simulated lard" would have the advantage of providing uniform and consistent product performance as is characteristic of vegetable shortenings, and in addition, would be unobjectionable to certain religious organizations.

It is the object of this invention to provide a lard flavor concentrate capable of overcoming the above-mentioned deficiencies of lard per se. The method of accomplishing the object of this invention will become apparent from the following description.

SUMMARY OF THE INVENTION

This invention relates to a lard flavor concentrate which when added to vegetable oils and plastic shortenings at a level of from 25 parts per million (ppm) to 250 ppm will provide the flavor and aroma characteristic of lard itself. The flavor concentrate comprises as essential ingredients from 1.4 percent to 4 percent by weight of 2,4-nonadienal, from 3.5 percent to 8 percent by weight of 2,4-decadienal, from 3 percent to 5 percent by weight of 2,5-dimethyl-3-ethyl pyrazine, from 0.1 percent to 0.5 percent by weight of tetramethylpyrazine, from 6 percent to 30 percent by weight of pyroligneous acid, and the balance comprising an edible dispersant. Additional preferred but non-essential ingredients in the lard flavor concentrate are propional, at a level of from 0 percent to 1.5 percent, nonanal, at a level of from 0 percent to 2 percent, 2-octen-1-al at a level of from 0 percent to 1.5 percent, 2-hepten-1-al at a level of from 0 percent to 2.25 percent, diacetyl at a level of from 0 percent to 15 percent, and from 0 percent to 6 percent by weight of propionic acid.

DETAILED DESCRIPTION OF THE INVENTION

The lard flavor concentrate of this invention comprises 3 essential portions, each contributing their own peculiar flavor characteristics which when combined provide an overall flavor and aroma appearance identical to that of lard itself. These three portions, for convenience of description herein, are identified as the aldehyde portion, the pyrazine portion, and the pyroligneous acid portion.

Turning first to the aldehyde portion which comprises two components, i.e., 2,4-nonadienal and 2,4-decadienal. The 2,4-nonadienal comprises from 1.4 percent by weight to 4 percent by weight of the total lard flavor concentrate, and the 2,4-decadienal comprises from 3.5 percent to 8 percent by weight of the total lard flavor concentrate. These two ingredients contribute to the over-all flavor and aroma a fatty taste, and an oxidized fat aroma note often characterized as a typical smell of old or heated fat. Amounts of each of these ingredients in excess of the maximum amount previously specified must not be employed because greater amounts provide too much of an overpowering oxidized note and destroy the lard flavor and aroma impact. For optimum flavor contribution it is preferred that the 2,4-nonadienal comprise from 1.5 percent to 3.5 percent by weight of the total lard flavor concentrate, and that the 2,4-decadienal comprise from 4 percent to 7.5 percent by weight of the total lard flavor concentrate.

The second essential portion of the lard flavor concentrate comprises pyrazine-derived compounds. More specifically, it comprises 2,5-dimethyl-3-ethyl pyrazine and tetramethyl pyrazine. The 2,5-dimethyl-3-ethyl pyrazine can comprise from 3 percent to 5 percent by weight of the total lard flavor concentrate, and the tetramethyl pyrazine can comprise from 0.1 percent to 0.5 percent by weight of the total lard flavor concentrate. Utilizing each of these pyrazine-derived compounds within their prescribed percentage proportions contributes a browned or fried flavor and aroma note characteristic of lard. Amounts of the pyrazine-derived compounds in excess of those specified herein should not be employed because doing so has been found to mask other desirable flavor notes and to create a dominant and strong fried or browned flavor note not characteristic of lard itself. On the other hand, amounts less than the minimum amount of the pyrazine-derived compounds should not be employed because there is insufficient compound present to provide the requisite browned fried aroma and flavor notes. The preferred amount of 2,5-dimethyl-3-ethyl pyrazine in the lard flavor concentrate is from 3.5 percent to 4.5 percent by weight of the total lard flavor concentrate, and, a preferred amount of the tetramethyl pyrazine is from 0.2 percent to 0.4 percent by weight of the total lard flavor concentrate.

The third essential portion of the lard flavor concentrate comprises pyroligneous acid. More specifically, the third essential portion of a lard flavor concentrate comprises from 6 percent to 30 percent by weight of the total lard flavor concentrate of pyroligneous acid. The pyroligneous acid portion has been found essential in that it contributes flavor and aroma notes characterized as rendered-smoky, and the hickory or wood smoke flavor and aroma often associated with the smell of an open kettle of lard. Amounts of pyroligneous acid in excess of 30 percent by weight of the lard flavor concentrate should not be employed because the characteristic pyroligneous acid flavor and aroma becomes too dominant; on the other hand, amounts less than 6 percent are insufficient to provide the requisite flavor and aroma contribution. Preferred amounts of pyroligneous acid are from 7 percent to 20 percent by weight of the total lard flavor concentrate.

In the broadest application of this invention, the lard flavor concentrate comprises the three previously mentioned essential portions and the balance comprises an edible dispersant such as vegetable oils, for example soybean oil, cottonseed oil and the like; propylene glycol, triacetin, and other common aroma carriers such as benzyl alcohol, glycerine, and ethyl acetate. In addition, deodorized hardstock from beef tallow may be employed as the edible dispersant for the lard flavor concentrate of this invention; in this connection it should be noted that while the description given herein is in connection with flavoring vegetable oils and shortenings, animal-derived fats such as those derived from tallow may also be employed. Preferred edible dispersants are vegetable oils, propylene glycol, and triacetin.

The previously described lard flavor concentrate is added to a glyceride oil or shortening such as vegetable oil at a level of from 25 ppm to 250 ppm, and preferably at a level of from 75 ppm to 150 ppm. Amounts of lard flavor concentrate in excess of 250 ppm should not be employed because the lard flavor and aroma becomes overpowering; conversely, amounts less than 25 ppm should not be employed because the flavor and aroma characteristics of lard are negligible when such small amounts are employed. The lard flavor concentrate can be added to the completely processed glyceride oil or shortening and blended therewith or, alternatively, the lard flavor concentrate can be added during processing, for example, in the case of plastic shortenings just prior to winterization and tempering, and in the case of liquid oils, subsequent to refining, bleaching and deodorizing and previous to packaging.

No criticality exists with regard to the exact oil or shortening which is to be flavored with the lard flavor concentrate of this invention, and any suitable and conventional fat, i.e., liquid or plastic shortening commonly utilized in preparing edible foods can be employed. Generally, these fats and oils comprise liquid or semi-liquid glyceride shortenings derived from animal, vegetable, or marine fats and oils, including synthetically prepared shortenings. These glycerides can contain saturated or unsaturated "long chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucoyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, tallow and the like. These glycerides can also contain, in part, one or two short chain acyl groups having from 2 to about 6 carbon atoms such as acetyl, propanoyl, butanoyl, valeryl, and caproyl; they can be prepared by random or low-temperature interesterification reactions of fatty triglyceride-containing oils and fats, such as interesterified or rearranged cottonseed oil; and they can be otherwise formed by various organic syntheses.

As those skilled in flavor and aroma chemistry know, care must be taken in formulating flavor and aroma concentrates, and any small deviation from successful combinations can provide an entirely different and unsatisfactory flavor and aroma. It is the combination of the previously mentioned three essential portions, each within its carefully prescribed range, which provides the overall flavor and aroma impact of lard itself. In other words, the result obtained, that is, a lard flavor and aroma impact, is obtained by blending the aldehyde portion which provides a fatty taste, and oxidized notes characteristic of old fat or heated fat, with the pyrazine portion which contributes browned and fried flavor and aroma notes, and the pyroligneous acid portion which contributes rendered, smoky flavor and aroma notes to provide an overall sensory impact identical to lard itself.

While not essential to the broadest aspect of this invention but preferable from the standpoint of producing a lard flavor concentrate most nearly resembling lard itself in flavor and aroma, the lard flavor concentrate in addition to the three previously described essential portions can comprise the following preferred ingredients: from 0 percent to 1.5 percent by weight of propional, and from 0 percent to 2 percent by weight of nonanal, both of which contribute characteristic deep-fat or base fat flavor and aroma notes and add depth to the flavor and aroma of the previously described essential aldehyde portions; from 0 percent to 1.5 percent by weight of the lard flavor concentrate of 2-octen-1-al, and from 0 percent to 2.25 percent of 2-hepten-1-al, both of which are advantageous because they further blend together the characteristic aroma and flavor notes of the three previously described essential portions, and in particular can be described as bridging the gap between the flavor and aroma of the aldehyde portion and the characteristic deep-fat flavor and aroma notes contributed by the previously mentioned preferred ingredients of propional and nonanal; from 0 percent to 15 percent by weight of the total lard flavor concentrate of diacetyl, which contributes characteristic lard top flavor notes to the overall composition; and from 0 percent to 6 percent by weight of the total lard flavor concentrate of propionic acid which contributes astringent, sharp flavor and aroma notes peculiarly characteristic to animal, and in particular, hog fat.

Preferred amounts of the above listed non-essential but preferred ingredients are: from 0.70 percent to 1.5 percent by weight of propional; from 0.7 percent to 1.9 percent by weight of nonanal; from 0.5 percent to 1.5 percent by weight of 2-octen-1-al; from 1.0% to 2.25% by weight of 2-hepten-1-al; from 0.5 percent to 1.5 percent by weight of diacetyl and from 3 percent to 6 percent by weight of propionic acid.

As is evident from the previous description, each of the chemical ingredients specified herein are readily available from specialty chemical supply houses, and in the case of pyroligneous acid, from well known wood-destructuve distillation processes. For further description of each of the above mentioned compounds and sources therefor, see Merck's Chemical Index or any standard chemical dictionary.

The following examples are offered to further illustrate the utility and performance of the lard flavor concentrate of this invention.

EXAMPLE 1

A lard flavor concentrate of the following formula was prepared:

| Ingredient | Percent By Weight of Total Flavor Concentrate |
|---|---|
| 2,4-nonadienal | 1.5 |
| 2,4-decadienal | 3.75 |
| 2,5-dimethyl-3-ethyl pyrazine | 3.0 |
| Tetramethylpyrazine | .12 |
| Pyroligneous acid | 30.00 |
| Propional | 1.5 |
| Nonanal | 1.9 |
| 2-octen-1-al | 1.5 |
| 2-hepten-1-al | 2.25 |
| Diacetyl | 1.5 |
| Propionic acid | 6.00 |
| Propylene glycol edible dispersant | Balance |
| Total: | 100.00% |

The above described lard flavor concentrate was placed in a leading commercially available vegetable oil which comprised predominantly soybean oil at levels of from 60 ppm, 120 ppm, and 240 ppm. Thereafter the flavored samples were evaluated by an expert panel and it was determined that at 240 ppm the lard flavor and aroma was satisfactory but the intensity was approaching the maximum limit. At 120 ppm an excellent lard flavor aroma was found to exist, and at 60 ppm good flavor was noted but the panel rated the intensity of the flavor and aroma as somewhat weak.

Substantially similar results in regard to lard aroma and flavor are obtained when the edible dispersant of this example is a vegetable oil or triacetin.

EXAMPLE 2

In this example, the previously described lard flavor concentrate placed in the previously described oil at a level of 240 ppm was evaluated against lard itself in baking properties in preparing baked layer cakes.

A commercially available leading cake mix known as a "white oil cake mix" was utilized for this comparison test. The cake mix was divided into two equal portions, and 1/2 of the recipe was prepared in accord with the instructions given, and 1/3 of a cup of the previously described lard flavor containing vegetable oil was substituted for the cooking oil called for the recipe. The other 1/2 portion of the culinary mix was baked utilizing 1/3 cup of melted lard.

The baked cakes were evaluated by an expert panel who characterized the cake containing the lard flavor concentrate of this invention as having more aroma than the lard-containing cake, slightly more browned in appearance than the lard-containing cake, and having a flavor character very close to lard but slightly fuller in body.

EXAMPLE 3

The procedure of Example 2 was duplicated utilizing a leading commercially available golden butter cake recipe. The margarine called for in the recipe was not added and in place thereof 56 grams of the lard flavor concentrate containing vegetable oil of Example 1 was substituted in a 1/2 portion of the recipe, and in the other 1/2 portion, 56 grams of lard was substituted for margarine. After baking the cakes were evaluated by a panel and were noted to have identical aroma characteristics, however, the lard aroma intensity of the cake containing the lard flavor concentrate of this invention was deemed to be greater than that of the cake containing lard itself. The cake embodying the lard flavor concentrate of this invention was deemed to be more browned and caramelized in flavor and having characteristics very similar to lard-containing cakes but deemed slightly richer.

EXAMPLE 4

A leading commercially available pancake mix having no flavor additives was obtained, and pancake batter was prepared utilizing vegetable oil (unflavored) in following the cake mix directions. The pancake batter was utilized to prepare pancakes by frying the batter in lard and with respect to another portion of the batter, by frying in vegetable oil, i.e., soybean oil containing the lard flavor concentrate of Example 1 at a level of 120 ppm. Thereafter the pancakes were evaluated by an expert panel who designated those cakes which were fried in lard as having a typical fatty rendered lard taste, and those cakes fried in the vegetable oil containing the lard flavor concentrate of this invention as having a flavor very similar to the lard-containing cakes, but noted to be not quite as fatty as the lard-containing cakes.

Further testing revealed that when the lard flavor concentrate of this invention was added to vegetable oils to be utilized in frying, the higher level range of 240 ppm can easily be used with excellent results.

EXAMPLE 5

A pie crust formulation was prepared utilizing approximately 1 1/3 cups of sifted regular flour, 1/2 teaspoon of salt, 1/2 cup of soybean oil, and 3 tablespoons of water. The mixture was stirred, rolled, and cut into 2 inch round pieces which were subsequently baked in an oven until brown, approximately 10-15 minutes at 400°F. Thereafter the baked portions were removed from the oven and one-half were sprayed at a level of 10 percent by weight of the pastry portion with melted lard, and the other one-half of the pastry portions were sprayed at the same level with soybean oil containing the liquid flavor concentrate of Example 1 at a level of 240 ppm.

A panel of expert tasters was asked to evaluate each of the samples, not knowing which was sprayed with lard and which was sprayed with the lard flavor concentrate-containing oil. The panel rated the flavor and aroma of the samples as identical, indicating that those samples sprayed with the product of this invention were equivalent to those samples sprayed with lard itself.

What is claimed is:

1. A lard flavor concentrate comprising from 1.4 percent to 4 percent by weight of 2,4-nonadienal, from 3.5 percent to 8% by weight of 2,4-decadienal, from 3 percent to 5 percent by weight of 2,5-dimethyl-3-ethyl pyrazine, from 0.1 percent to 0.5 percent by weight of tetramethylpyrazine, from 6 percent to 30 percent by weight of pyroligneous acid, and the balance comprising an edible dispersant.

2. A lard flavored-glyceride oil comprising a glyceride oil and from 25 ppm to 250 ppm of the lard flavor concentrate of claim 1.

3. A lard flavored-vegetable oil comprising a vegetable oil and from 75 ppm to 150 ppm of the lard flavor concentrate of claim 1.

4. The lard flavor concentrate of claim 1 wherein the amount of 2,4-nonadienal is from 1.5 percent to 3.5 percent, and the amount of 2,4-decadienal is from 4 percent to 7.5 percent.

5. The lard flavor concentrate of claim 4 wherein the amount of 2,5-dimethyl-3-ethyl pyrazine is from 3.5 percent to 4.5 percent, and the amount of tetramethylpyrazine is from 0.2 percent to 0.4 percent.

6. The lard flavor concentrate of claim 5 wherein the amount of pyroligneous acid is from 7 percent by weight to 20 percent by weight.

7. The lard flavor concentrate of claim 6 wherein the edible dispersant is selected from the group consisting of vegetable oil, propylene glycol, and triacetin.

8. The lard flavor concentrate of claim 7 wherein the concentrate contains as additional ingredients from 0 percent to 1.5 percent of propional, from 0 percent to 2 percent by weight of nonanal, from 0 percent to 1.5 percent by weight of 2-octen-1-al, from 0 percent to 2.25 percent by weight of 2-hepten-1-al, from 0 percent to 15 percent by weight of diacetyl, and from 0 percent to 6 percent by weight of propionic acid.

9. The lard flavor concentrate of claim 8 wherein the amount of propional is from 0.7 percent to 1.5 percent, the amount of nonanal is from 0.7 percent to 1.9 percent, the amount of 2-octen-1-al is from 0.5 percent to 1.5 percent, the amount of 2-hepten-1-al is from 1.0 percent to 2.25 percent, the amount of diacetyl is from 0.5 percent to 1.5 percent, and the amount of propionic acid is from 3.0 percent to 6.0 percent.

10. A lard-flavored vegatable oil comprising vegetable oil and from 75 ppm to 150 ppm of the lard flavor concentrate of claim 9.

* * * * *